(12) United States Patent
Gutierrez

(10) Patent No.: US 10,797,473 B1
(45) Date of Patent: Oct. 6, 2020

(54) CABLE ROD GUIDING DEVICE

(71) Applicant: Smart Prototype, Inc., Miami, FL (US)

(72) Inventor: Edduar Gutierrez, Miami, FL (US)

( * ) Notice: Subject to any disclaimer, the term of this patent is extended or adjusted under 35 U.S.C. 154(b) by 0 days.

(21) Appl. No.: 16/826,139

(22) Filed: Mar. 20, 2020

(51) Int. Cl.
*H02G 1/06* (2006.01)
*H02G 3/22* (2006.01)
*H02G 1/08* (2006.01)

(52) U.S. Cl.
CPC ............... *H02G 1/06* (2013.01); *H02G 1/081* (2013.01); *H02G 1/088* (2013.01); *H02G 3/22* (2013.01); *H02G 1/08* (2013.01)

(58) Field of Classification Search
CPC . F16L 2101/50; G02B 6/4463; G02B 6/4465; H02G 1/00; H02G 1/08; H02G 1/081; H02G 1/088
See application file for complete search history.

(56) References Cited

U.S. PATENT DOCUMENTS

| | | | | |
|---|---|---|---|---|
| 4,537,136 | A * | 8/1985 | Douglas | F16L 55/34 104/138.2 |
| 4,684,211 | A * | 8/1987 | Weber | G02B 6/4465 254/134.3 R |
| 4,862,808 | A * | 9/1989 | Hedgcoxe | B25J 5/007 104/138.2 |
| 7,505,063 | B1 * | 3/2009 | Bastedo | B08B 9/043 15/104.05 |
| 7,812,328 | B2 * | 10/2010 | Betz | B01J 19/123 250/493.1 |
| 8,185,241 | B2 * | 5/2012 | Jacobsen | B62D 55/0655 700/250 |
| 9,316,340 | B2 * | 4/2016 | Liu | F16L 55/32 |
| 9,869,420 | B2 * | 1/2018 | Penza | F16L 55/32 |
| 10,603,600 | B2 * | 3/2020 | Farrell | A63H 18/02 |
| 2005/0029986 | A1 * | 2/2005 | Morgan | H02J 7/0047 320/118 |
| 2011/0227012 | A1 * | 9/2011 | Wang | H02G 1/08 254/134.5 |

(Continued)

OTHER PUBLICATIONS https://www.amazon.com/Old-Timer-Fiberglass-Puller-Running/dp/B0763V51CS/ref=sr_1_1?keywords=CABLE+ROD&qid=1579802612& s=industrial&sr=1-1.

*Primary Examiner* — Tyrone V Hall, Jr.
(74) *Attorney, Agent, or Firm* — Sanchelima & Associates, P.A.; Christian Sanchelima; Jesus Sanchelima

(57) ABSTRACT

A cable rod guiding device including a housing assembly, an arm assembly, a camera assembly, and a control assembly. The cable rod guiding device is mounted to a cable rod to be maneuvered within an obstructed space. The housing assembly includes a housing having a first portion and a second portion. The control assembly includes a motor housed in the second portion to control an articulating arm of the arm assembly. The camera assembly includes a camera to provide a view of the obstructed space to detect and overcome obstructions along the obstructed space through which the cable rod guiding device is maneuvered through. Upon the detection of an obstruction, the obstruction is avoided or overcome through the usage of the articulating arm being controlled by a user and the control assembly. Allowing the user to safety, efficiently, and effectively pass cable through the obstructed space with minimal effort.

16 Claims, 8 Drawing Sheets

(56) References Cited

U.S. PATENT DOCUMENTS

2014/0054525 A1* 2/2014 Spijker .................. F16L 55/00
                                                    254/134.3 R
2016/0220915 A1* 8/2016 Cheung ................. A63H 18/02

* cited by examiner

CABLE ROD GUIDING DEVICE

BACKGROUND OF THE INVENTION

1. Field of the Invention

The present invention relates to a cable rod guiding device and, more particularly, to a cable rod guiding device that enables a user to safely, quickly and efficiently pass cables through remote obstructed spaces.

2. Description of the Related Art

Several designs for cable rod guiding devices have been designed in the past. None of them, however, include a cable rod guiding device that allows a user to install cable through tight, remote and obstructed spaces. State of the art cable rods are known as: https://www.amazon.com/Old-Timer-Fiberglass-Puller-Running/dp/B0763V51CS/ref=sr_1_1?keywords=CABLE+ROD&qid=1579802612&s=industrial&sr=1-1 (last visited on Jan. 21, 2020). The present invention is capable of being catapulted over obstructions to install the cables efficiently in remote and otherwise inaccessible spaces. The present invention also includes a camera that provides a visual of the obstructions that are encountered as the cable is being guided. The obstructions are overcome through the usage of an arm that is articulated and manipulated by a user to propel the device of the present invention over the obstructions encountered. Frustrations from blindly guiding a cable rod through a remote, tight or obstructed space are eliminated with the use of the present invention. Hence, there is a need for a cable rod guiding device that facilitates the process of passing cables through remote and obstructed spaces, such as through walls or ceilings, in a manner that is most efficient.

Applicant believes that a related reference corresponds to U.S. patent publication No. US20110227012 for applicant SwissCom AG for a Cable Pusher Guiding System, Method and Device. The cited reference discloses a steerable head for guiding a pusher rod through ducting. The pusher rod is then used for drawing cables, wires, line or pipes through the ducting. The steerable head includes remotely operable mechanisms for steering the rod through junctions or around obstacles in the ducting. The steerable head further includes a coupling mechanism adapted to cooperate with a corresponding coupling mechanism mounted on a second rod, which permits pushing or additional rods through longer ducts. However, it differs from the present invention because the present invention includes a camera assembly to view obstacles encountered in the remote spaces as a cable rod is being inserted and maneuvered therethrough. Further, the present invention also includes an articulating arm adapted to be rotated 360 degrees to overcome obstacles encountered and seen through the camera assembly.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cable rod guiding device to easily, safely and efficiently pass cables, wires or the like through tight, obstructed and/or remote spaces.

It is another object of the present invention to provide a cable rod guiding device that facilitates passing cables through obstructed spaces with a camera assembly to view and identify obstructions.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
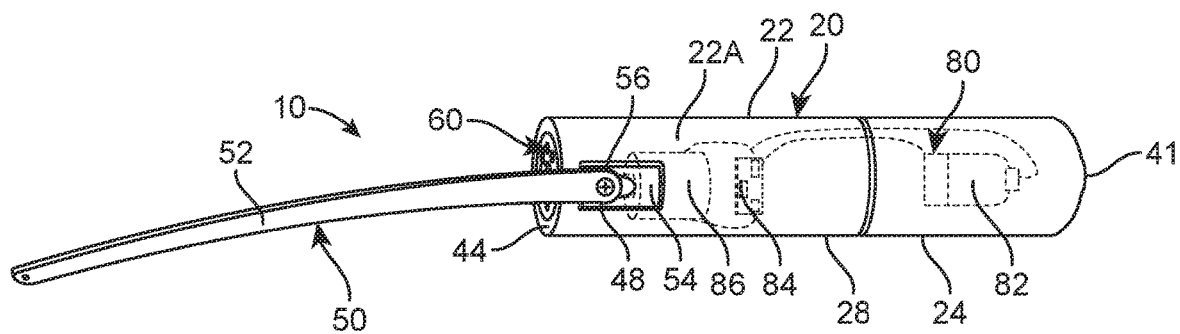
FIG. 1 represents an isometric view of the cable rod guiding device 10.

Referring now to the drawings, where the present invention is generally referred to with numeral 10, it can be observed that it, basically includes a housing assembly 20, arm assembly 50, camera assembly 60 and control assembly 80.

Referring to FIGS. 1 through 9, the present invention is referred to as cable rod guiding device 10. Cable rod guiding device 10 is removably mounted onto a cable rod 162. The present invention may also include an adapter to allow mounting of different sized cable rods to cable rod guiding device 10. Cable rod 162 may include a cable 164. Cable 164 is preferably mounted to a distal end of cable rod 162.

Cable 164 may be a rope, wire or other similar flexible and elongated objects. Cable rod guiding device 10 and cable rod 162 may be inserted through an opening to navigate remote and obstructed locations or spaces such as ceilings or walls. Subsequently, cable rod guiding device 10 and cable rod 162 are pushed and maneuvered through the obstructed space until an exit out of the obstructed space is reached. Once the desired end of the obstructed space is reached, the present invention is caused to protrude sufficiently to expose cable 164. Then, cable rod guiding device 10 and cable rod 162 are removed. Thereby resulting in cable 164 being left in place, as necessary, along the path traveled and navigated by the present invention through the obstructed space.

Figure 2:
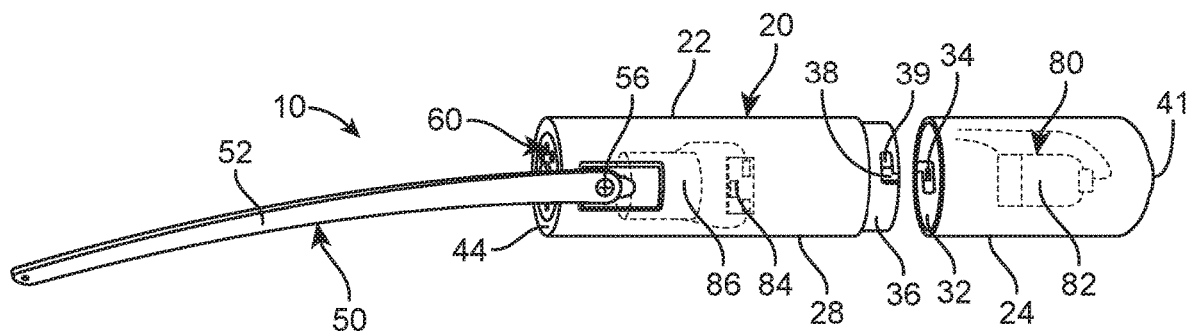
FIG. 2 shows an isometric view of the housing 22 separated into the first portion 24 and the second portion 28.
Figure 3:
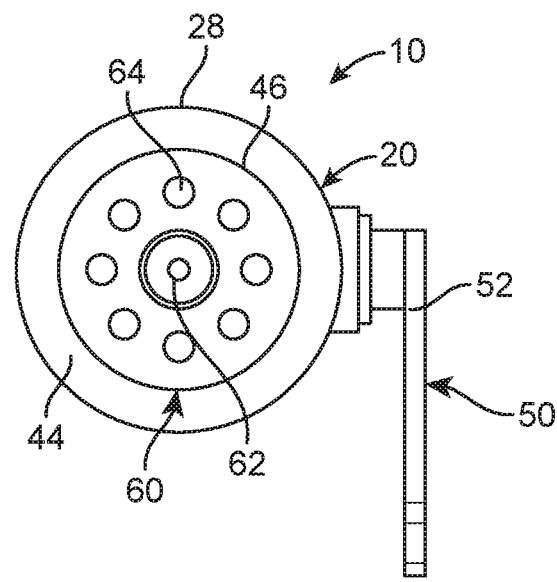
FIG. 3 illustrates a front elevational view of the cable rod guiding device 10 showing the disposition of housing 22, arm assembly 50 and camera assembly 60.
Figure 4:
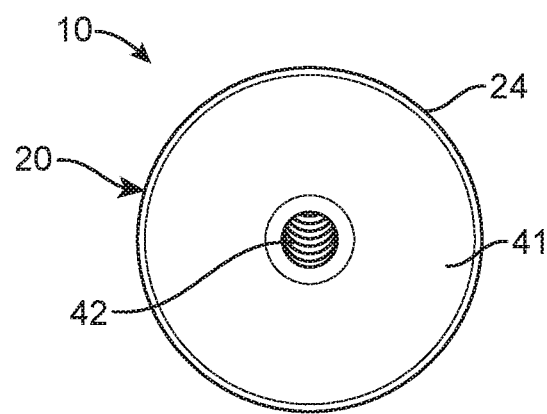
FIG. 4 depicts an elevated rear view of the cable rod guiding device 10 showing threaded opening 42 where the cable rod 162 (not shown) is to be attached.
Figure 5:
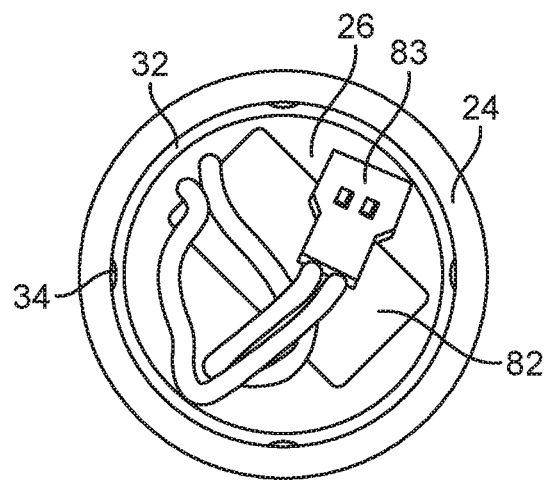
FIG. 5 represents an internal view of the first section 24 of the housing 22 of the present invention displaying the male connectors 34 which engage the second section 28 and the battery 82 being housed therein.
Figure 6:
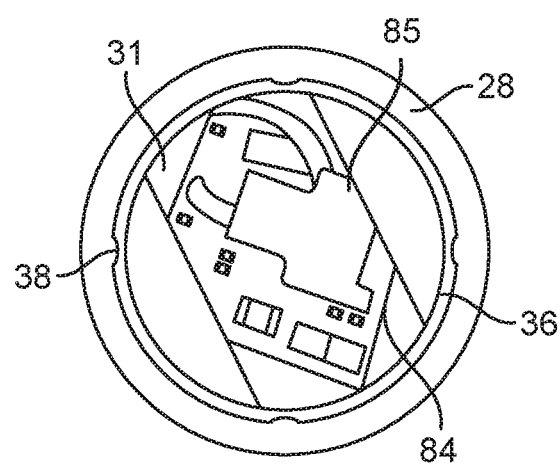
FIG. 6 shows an internal view of the second section 28 of the housing 22 of the present invention displaying the female connectors 38 which engage the first section 24 and the components housed therein.

It can be best seen in FIGS. 1 and 2 that housing assembly 20 includes a housing 22. Housing 22 may preferably be substantially cylindrical and elongated, without sharp edges. However, other shapes may be suitable for housing 22. Preferably, housing 22 is hollow to receive, hold and secure components of the present invention therein. Housing 22 includes a first portion 24 and a second portion 28. Housing 22, in one of the preferred embodiments, includes two space apart ends connected to a wall 22A in between, thereby defining a space therein. It is to be understood that first portion 24 and second portion 28 define wall 22A. In one of the embodiments, first portion 24 may be of a lesser length than second portion 28. In one of the preferred embodiments, first portion 24 and second portion 28 have substantially the same length. In an alternate embodiment, first portion 24 has a length greater than second portion 28. First portion 24 and second portion 28 are flush with one another once interconnected to create housing 22. In an alternate embodiment, housing 22 may be whole, instead of being capable of separating into multiple portions. First portion 24 may include a first portion opening 26 adapted to permit access to the interior of first portion 24. Second portion 28 may include a second portion opening 31 adapted to permit access to the interior of second portion 28. It should be understood that each of first portion 24 and second portion 28 partially include the shape and dimensions necessary to create the elongated cylindrical shape of housing 22 once first portion 26 and second portion 28 are axially mounted to each other.

First portion 24 may include a first connector portion 32 with male connectors 34 mounted thereon. First connector portion 32 may be housed within first portion 24. Second portion 28 may include a second connector portion 36 extending from second portion 28 with female connectors 38 mounted thereon. Male connectors 34 may be bumps, nipples or small protrusions. Female connectors 38 may be an L-shaped path including a crater 39 adapted to receive male connectors 34. It is to be understood that female connectors 38 may suitably be of predetermined shapes. First portion 24 and second portion 28 may also suitably be connected through other means such as with hook and loop straps, buttons, snap buttons, threading, fasteners, welding, adhesives or the like, as well as combinations thereof. First portion opening 26 may include a diameter greater than that of second connector portion 36. First portion opening 26 and first connector portion 32 may have the same diameter. Second connector portion 36 may be entirely received and covered by first connector portion 32. Thereby resulting in male connectors 34 being received by female connectors 38. Once male connectors 34 have been engaged by female connectors 38, second portion 28 may be turned in a predetermined direction until male connectors 34 are secured by each of crater 39. Resulting in first portion 24 and second portion 28 being flushly and securely mounted together to assemble housing 22.

First portion 24 includes a first portion distal end 41 which may taper inwardly. A threaded opening 42 may be centrally located on first portion 24 at first portion distal end 41. Threaded opening 42 partially extends through first portion 24. Threaded opening 42 is adapted to receive and secure cable rod 162 to housing 22. Securing of cable rod 162 to the present invention permits for housing 22 to be pushed and guided through the obstructed space with cable rod 162. It should be understood that threaded opening 42 may be of a predetermined dimension and shape as per the needs of a user U. Second portion 28 includes a second portion distal end 44. At second portion distal end 44 is a camera opening 46. Adjacent to camera opening 46 may be an arm opening 48 at a predetermined location on housing 22. Arm opening 48 may be located on housing 22 at a predetermined distance from camera opening 46. Camera opening 46 may preferably be circular, in one embodiment. However, other predetermined shapes may be be suitable for camera opening 46 as the shape of camera opening 46 does not hinder functionality of camera opening 46. It is to be understood that, camera opening 46 may be adapted to cooperate with the shape and dimensions of a camera 62. Arm opening 48 may preferably be rectangular shaped but other predetermined shapes and dimensions may be suitable for arm opening 48. Arm opening 48 may be adapted to cooperate with the shape and dimensions of arm assembly 50.

Figure 7:
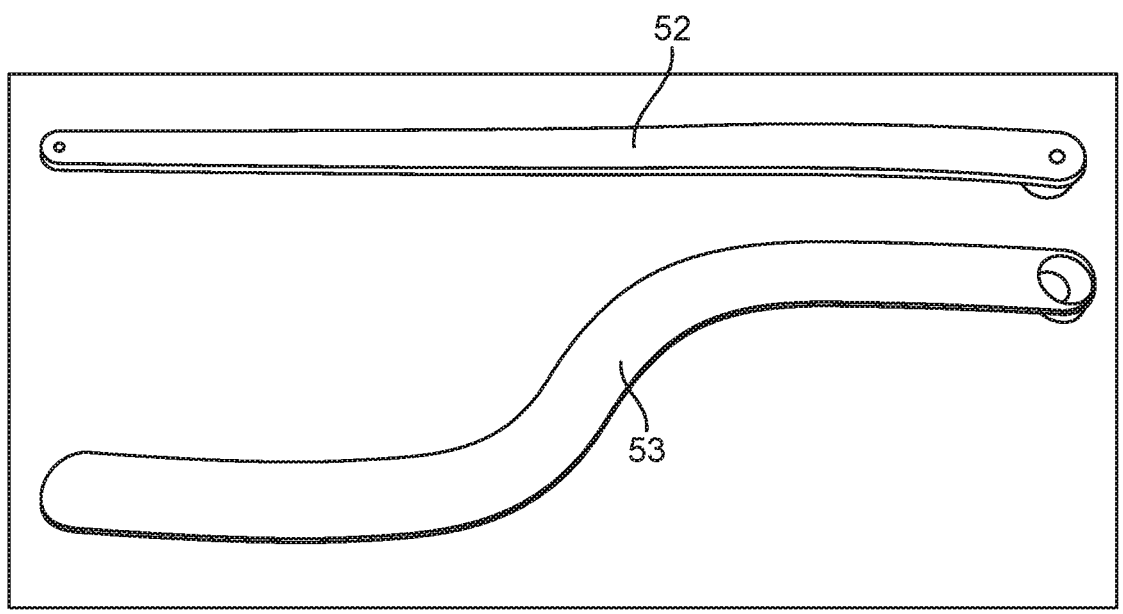
FIG. 7 is a side view illustrating the articulating arm 52 and curved articulating arm 53 of the arm assembly 50.
Figure 8:
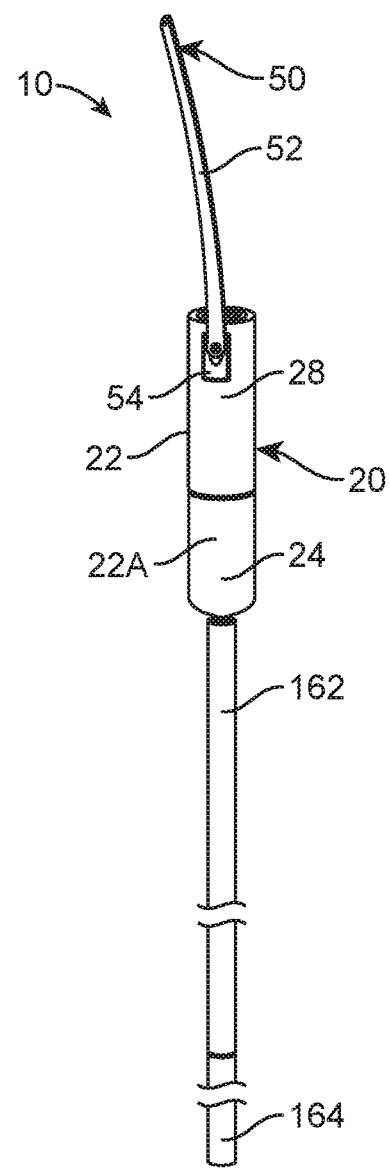
FIG. 8 shows an isometric elevated view of cable rod guiding device 10 ready to be used and mounted to cable rod 162.
Figure 9:
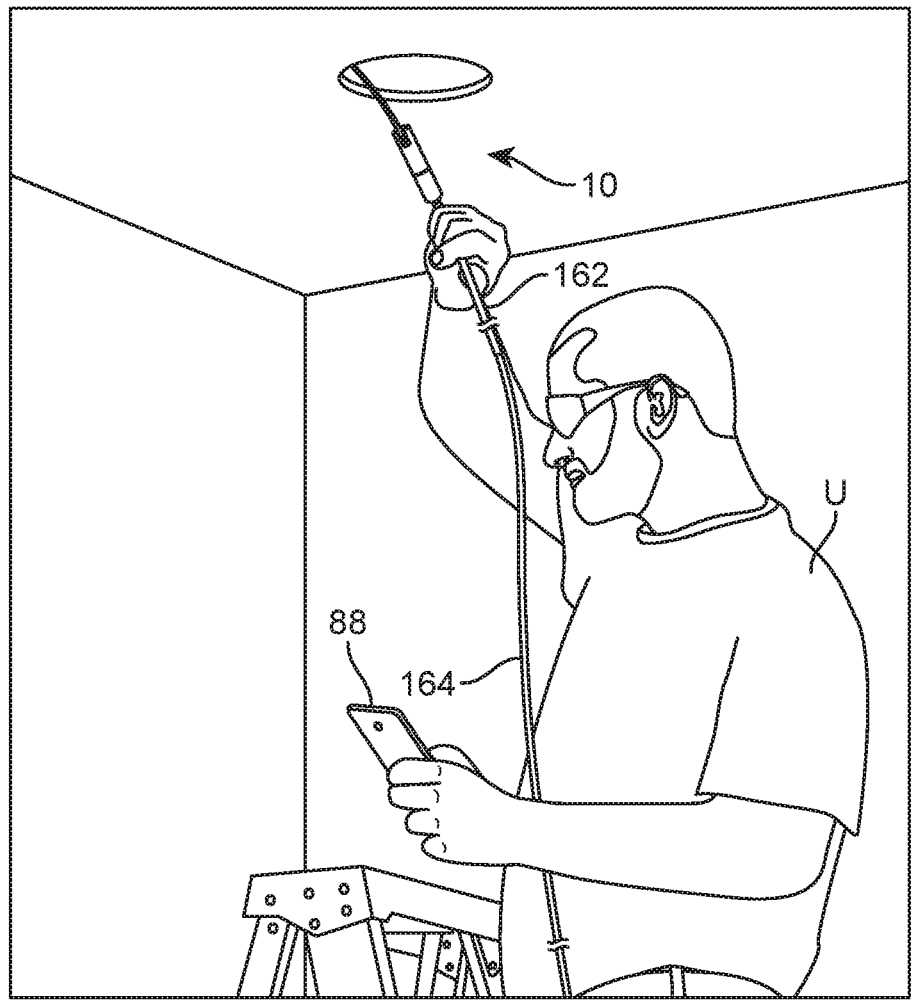
FIG. 9 illustrates cable rod guiding device 10 in an operational setting, with user U guiding cable rod 162 through a remote space with controller 88.

The present invention further includes arm assembly 50. Arm assembly 50 includes an articulating arm 52. In one of the embodiments, articulating arm 52 may be adapted to rotate 360 degrees to overcome obstructions encountered. Articulating arm 52 may permit for the present invention to be catapulted over obstructions. User U may control the rotation and positioning of articulating arm 52. Articulating arm 52 may be rotated about 360 degrees. It may also be suitable for articulating arm 52 to be maneuvered upwardly and downwardly. Arm assembly 50 further includes a connector piece 54 and a fastener 56. Articulating arm 52 may be removably mounted onto connector piece 54 with fastener 56. Other fastening means, such as adhesives, snap buttons, hook and loop straps or the like may be suitable to mount articulating arm 52 to connector piece 54. Connector piece 54 is received in arm opening 48. Articulating arm 52 may be substantially parallel to housing 22, at predetermined positions of articulating arm 52, once pivotally mounted thereto. Articulating arm 52 is mounted to connector piece 54 once connector piece 54 is secured to arm opening 48. Articulating arm 52 and connector piece 54 are engaged by components within second portion 28. The components housed within second portion 28 allow the movement and rotation of articulating arm 52. It is to be understood, articulating arm 52 may be interchangeable. Articulating arm 52 may be interchanged for an arm of a different dimensions and shape. Curved articulating arm 53 illustrates a possible interchangeable arm of the present invention, as best seen in FIG. 7. User U may interchange the arm to be used with the present invention depending on which arm would be most suitable for the working area to overcome the obstructions located. Preferably, articulating arm 52 may be shaped substantially straight. Curved articulating arm 53 may preferably be S-shaped. However, it should be understood that other predetermined shapes may be suitable for either of articulating arm 52 or curved articulating arm 53 depending on the needs of user U.

Cable rod guiding device 10 further includes a camera assembly 60. Camera assembly 60 includes a camera 62.

Camera 62 is adapted to provide a view of the surrounding work area through which cable rod guiding device 10 is navigated through. In one embodiment, camera 62 may be an infrared or night vision camera to allow viewing of the surrounding area in the obstructed spaces even in the dark. Optionally, camera assembly 62 may include a light 64. Light 64 may be used to illuminate the obstructed work area in order to easily located and identify obstacles along the obstructed work area in the dark. Light 64 may be an LED light, LCD light, fluorescent light, incandescent light or other suitable light. Camera 62 is preferably mounted within camera opening 46 and interconnected with other components located within second portion 28. Camera 62 and light 64 allow for the obstructions along the working space to be easily located and identified. The obstructions are displayed to user U at a remote location. Allowing user U to properly, accurately and easily operate and control arm assembly 50 to overcome the present obstructions. In an alternate embodiment, light 64 may be mounted to a distal end of articulating arm 52 or curved articulating arm 53. In an alternate embodiment, it may also be suitable for light 64 to be mounted at a predetermined location on housing 22. It is to be understood that it may be suitable for the present invention to include multiple of light 64.

Further, the present invention includes a control assembly 80. Control assembly 80 may importantly be used to control movement of articulating arm 52 or curved articulating arm 53. Control assembly 80 includes a battery 82, a microcontroller 84, a motor 86 and a controller 88. Motor 86 may alternatively be referred to as an electric motor assembly. Battery 82 may preferably be housed within first portion 24. It may be suitable for battery 82 to be inserted into first portion 24 through first portion opening 26. Microcontroller 84 and motor 86 may preferably be housed within second portion 28. Battery 82 may be used to provide power to microcontroller 84, motor 86, and camera 62. Motor 86 may be connected to connector piece 54 in order to engage and actuate articulating arm 52 or curved articulating arm 53 with motor 86. Battery 82 may preferably be rechargeable. It may be suitable for housing to include a charging port that allows a power source to be connected to battery 82 for recharging. Upon motor 86 being actuated, articulating arm 52 or curved articulating arm 53 are controlled with controller 88 to rotate, move upwardly or downwardly, as necessary. More specifically, signals from controller 88 are sent and received by microcontroller 84. Subsequently, microcontroller 84 sends the appropriate signal to motor 86 to actuate arm assembly 50 as needed to overcome obstructions encountered in the obstructed spaces. Allowing for cable 164 to be easily ran through the obstructed space. It is to be understood, controller 88 may be a remote control or a mobile device. Microcontroller 84 may communicate with controller 88 through means of Bluetooth, NFC, cellular networks, radio frequency, microwaves or Wi-Fi. It is to be understood that battery 82 may include a battery connector 83 that corresponds with a microcontroller connector 85 of microcontroller 84. Battery connector 83 and microcontroller connector 85 are interconnected to provide power from battery 82 to microcontroller 84 and all other components connected to microcontroller 84.

Camera 62 of camera assembly 60 may provide a real time view of the surrounding work area through controller 88. Camera 62 and controller 88 may communicate through means of Bluetooth, NFC, cellular networks, radio frequency, microwaves or Wi-Fi. The real time image of the working image may be viewed or displayed on controller 88.

Figure 10:
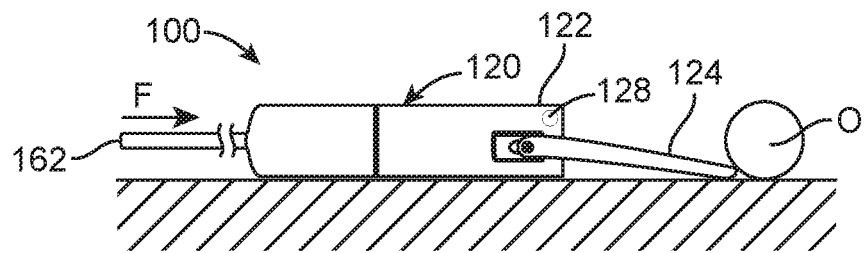
FIGS. 10-10E depict a sequence in which cable rod guiding device 100 is shown in usage overcoming an object O.
Figure 10A:
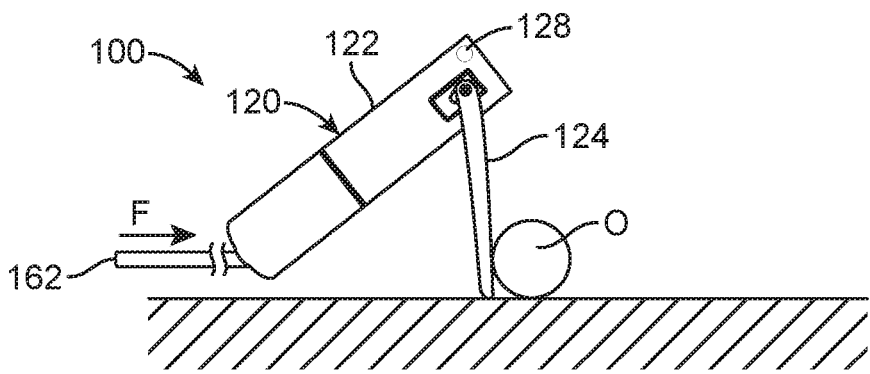
Figure 10B:
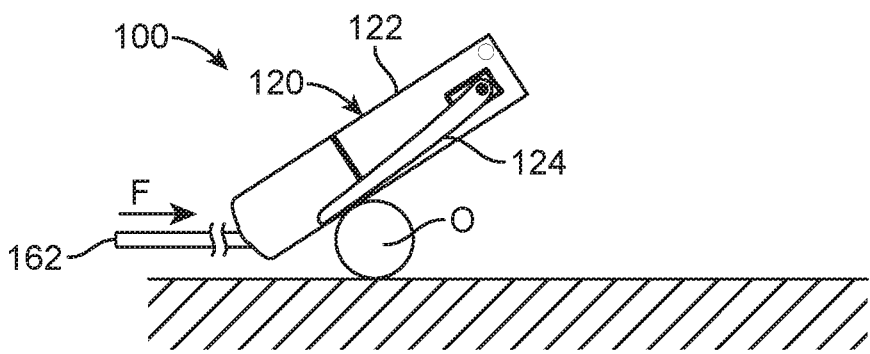
Figure 10C:
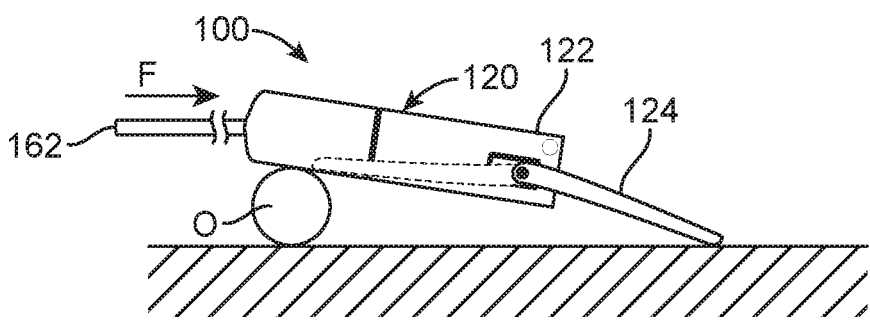
Figure 10D:
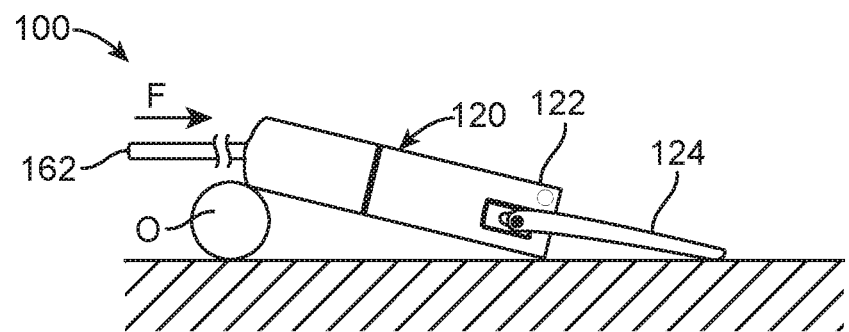
Figure 10E:
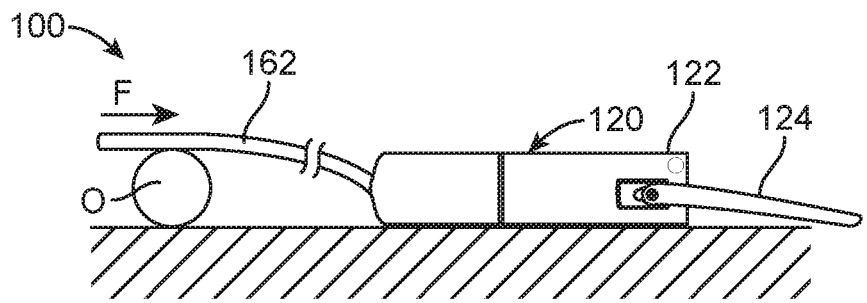
Figure 11:
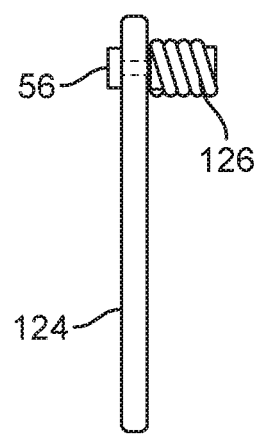
FIG. 11 shows a top view of an alternate embodiment, in which a spring 126 is mounted to arm 124 to reset and reposition arm 124.

In an alternate embodiment, the present invention may be referred to as a cable rod guiding device 100. Cable rod guiding device 100 may be similar to the aforementioned description above, with camera assembly 60 therein. Cable rod guiding device 100 may, however, be more cost and energy efficient. Cable rod guiding device 100 may lack motor 86, thereby resulting in less energy usage. Cable rod guiding device 100 includes a housing assembly 120 with a housing 122. Mounted to housing 122 is an arm 124. Importantly, mounted to arm 124 is a spring 126, as best seen in FIG. 11. Spring 126 causes arm 124 to reposition or reset after an object O is overcome with the present invention. Cable rod 162 is mounted to the distal rear end of housing 122 and cable 164 is mounted to the distal end of cable rod 162. A forward force F from the user pushing cable rod 162 through a remote location propels cable rod guiding device 100 forward. The sequence of cable rod guiding device 100 being used to overcome object O may be best seen in FIGS. 10-10E. The continued forward force F even upon object O being encountered by arm 124 causes arm 124 to become lodged at the contact point with object O. Arm 124 rotates and lifts housing 122 sufficiently above of object O. The continued forward force F from the user causes the object O to be overcome and arm 124 to move rearwardly. Once object O is cleared, spring 126 causes arm 124 to reset to the original positioning allowing another of object O to be encountered and overcome. It may also be suitable for housing assembly 120 to include a stopper 128, as seen in FIGS. 10-10E. Stopper 128 is preferably mounted perpendicularly to housing 122. Stopper 128 may extend outwardly and away from housing 122. Stopper 128 prevents arm 124 from rotating upwardly to maintain arm 124 in a ready position to encounter another of object O that is to be overcome.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cable rod guiding system, comprising:
   a. a housing assembly having an elongated shape with first and second ends and a wall extending between said first and second ends defining a space therein;
   b. an arm assembly having an arm rotably mounted to said wall, said arm being interchangeable with a curved articulating arm;
   c. an electric motor assembly coupled to said arm to impart a rotational movement to the arm, said electric motor assembly further including a wireless control to selectively operate said electric motor assembly;
   d. a camera assembly mounted to said first end;
   e. a battery for powering said electric motor assembly and said camera assembly so that when said electric motor assembly is actuated said housing assembly is lifted and pushed forward.

2. The system of claim 1, wherein said arm is substantially straight and said curved articulating arm is S-shaped.

3. The system of claim 1, wherein said housing assembly includes a threaded opening at said first end to secure a cable rod therein.

4. The system of claim 3, wherein said cable rod includes a cable mounted at a cable rod distal end.

5. The system of claim 1, wherein said camera assembly includes a light, said light is an LED light, LCD light, fluorescent light or incandescent light, multiple of said light are arranged in a circular configuration about the perimeter of said camera.

6. The system of claim 1, wherein said system includes a control assembly with a controller, said control assembly includes a microcontroller, said microcontroller and said controller communicate through means of one of Bluetooth, NFC, cellular networks, radio frequency, microwaves or wi-fi, said microcontroller and said controller communicate to actuate said arm.

7. The system of claim 6, wherein said camera assembly and said controller communicate through means of one of Bluetooth, NFC, cellular networks, radio frequency, microwaves or wi-fi in order for said camera to provide a real time view of the surrounding obstructed area through said controller.

8. The system of claim 6, wherein said controller displays a real time view of the surrounding obstructed area provided by said camera assembly.

9. The system of claim 6, wherein said battery assembly includes a battery connector, said microcontroller connector being connected with said battery connector to allow power from said battery to be provided to said microcontroller.

10. The system of claim 1, wherein said camera assembly is one of an infrared or night vision camera.

11. The system of claim 1, wherein said battery assembly is rechargeable.

12. The system of claim 1, wherein said housing assembly includes a first portion and a second portion, said first portion and said second portion connected together through hook and loop straps, buttons, snap buttons, threading, fasteners, welding, adhesives or combinations thereof.

13. The system of claim 1, wherein said housing assembly includes a threaded opening at a distal end of said housing, said cable rod mounted to said threaded opening.

14. A system for a cable rod guiding device comprising:
a. a cable rod;
b. an housing assembly including a housing having a first portion with a first portion opening and a second portion with a second portion opening, said first portion having a first connector portion including male connectors therein and said second portion having a second connector portion extending from said second portion, said second connector portion having female connectors thereon, said second connector portion having a diameter less than said first portion opening, said first portion opening and said first connector portion having a same diameter, said female connectors receive said male connectors to interconnect said first portion and said second portion of said housing, said first portion and said second portion being flush with one another when interconnected, said first portion further including a first portion distal end, said first portion distal end being tapered and including a threaded opening thereon, said cable rod secured to said threaded opening, said second portion including a second portion distal end including a camera opening, said second portion also including an arm opening, said arm opening being perpendicular to said camera opening;
c. an arm assembling including an articulating arm with a connector piece, said articulating arm removably mounted to said connector piece via a fastener, said connector piece mounted to said housing within said arm opening;
d. a camera assembly including a camera and a light, said camera being secured within said camera opening, said camera providing a view of an obstructed space;
e. a control assembly having a battery, a microcontroller, and a motor, said battery housed in said first portion, said motor and said microcontroller housed within said second portion, said battery being rechargeable;
f. a controller, said controller being a mobile device; and
g. said connector piece of said arm assembly being insert therethrough said arm opening of said second portion, said connector being mounted to said motor of said control assembly, said articulating arm adapted to rotate about 360 degree through actuation of said motor, said motor being controlled by said controller, said movement of said articulating arm controlled by said controller.

15. A cable rod guiding system, comprising:
a. a housing assembly having an elongated shape with first and second ends and a wall extending between said first and second ends defining a space therein;
b. an arm assembly having an arm rotably mounted to said wall, said arm having a spring mounted perpendicularly thereto, said spring allowing arm to snap forward after a rearward rotation;
c. a camera assembly mounted to said first end; and
d. a battery for powering said camera assembly, once an obstruction is detected said housing assembly is pushed forward by a forward force until said arm collides with said obstruction and elevates said housing assembly, said housing assembly is continuously pushed forward until said obstruction is overcome, said arm rotating rearwardly as the obstruction is overcome, said spring urging said arm forward to reset said arm for another of said obstruction to be encounter and overcome.

16. The system of claim 15, wherein a stopper is mounted to said housing assembly, said stopper being above of said arm, said stopper preventing said arm from rotating upwardly.

* * * * *